W. J. P. MOORE.
CONTROL MECHANISM FOR AUTOMOBILES AND OTHER VEHICLES AND MACHINES.
APPLICATION FILED MAR. 10, 1916.
1,254,057.
Patented Jan. 22, 1918.
2 SHEETS—SHEET 2.
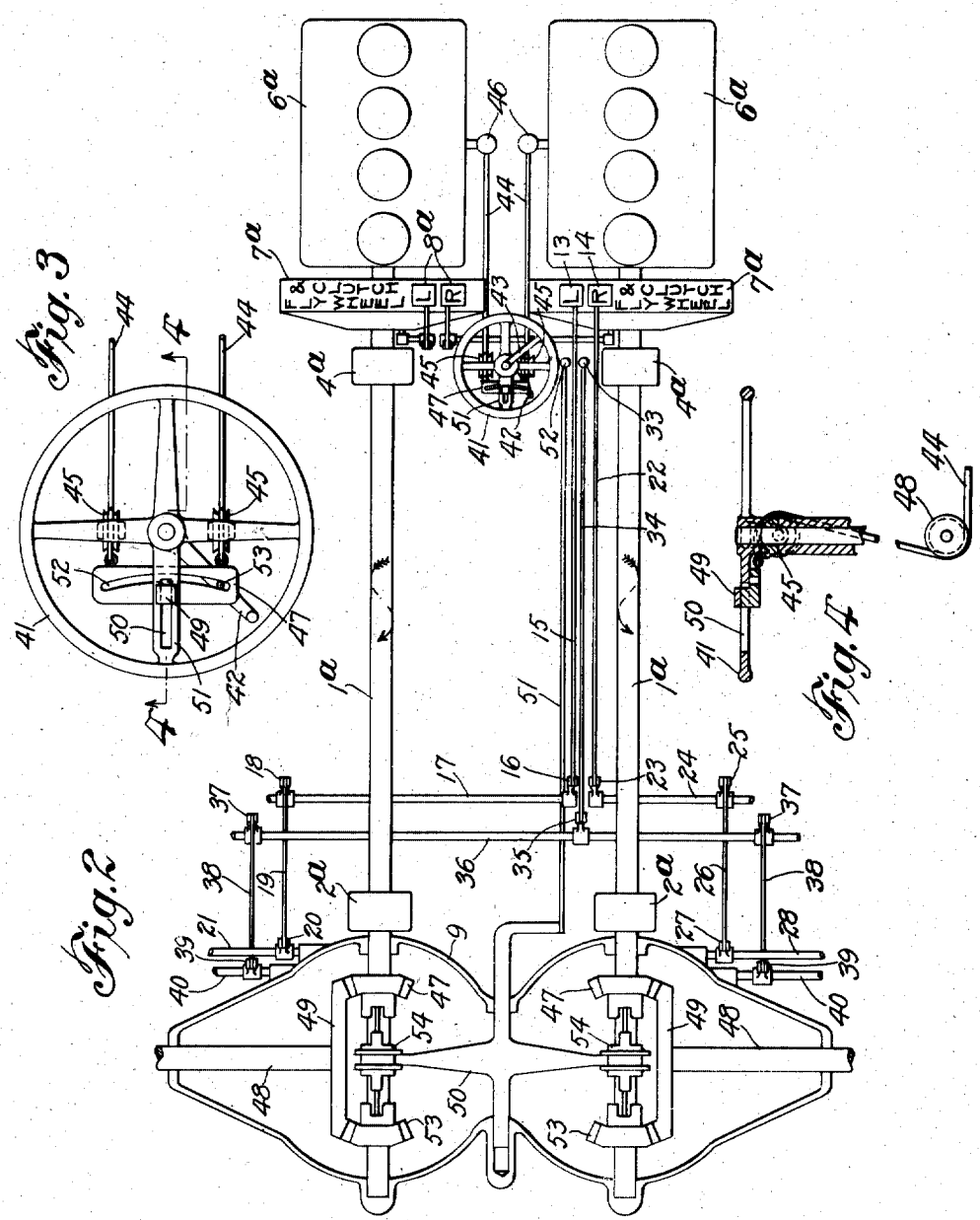
Inventor
William J. P. Moore
per Fred A. Tasker
Atty.

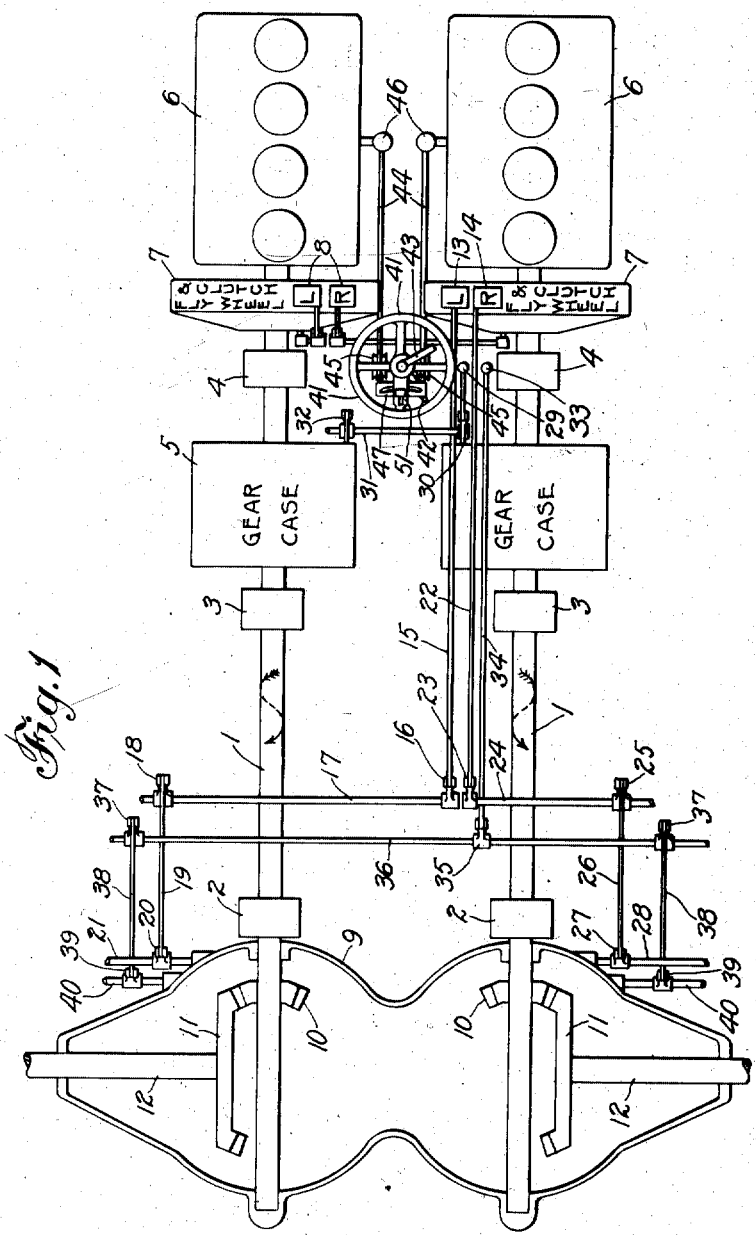

UNITED STATES PATENT OFFICE.

WILLIAM J. P. MOORE, OF NEW YORK, N. Y.

CONTROL MECHANISM FOR AUTOMOBILES AND OTHER VEHICLES AND MACHINES.

1,254,057.          Specification of Letters Patent.     Patented Jan. 22, 1918.

Application filed March 10, 1916. Serial No. 83,343.

*To all whom it may concern:*

Be it known that I, WILLIAM J. P. MOORE, a citizen of the United States, residing at New York, in the county of New York and State of New York, have invented certain new and useful Improvements in Control Mechanism for Automobiles and other Vehicles and Machines, of which the following is a specification, reference being had thereto in to the accompanying drawing.

My invention refers to a means for controlling the operation of an automobile or other vehicle or similar machine, the object being primarily to enable the drive wheels to be independently and positively actuated without the use of any differential gear, and at the same or different speeds, either by separate motors for each driving element or otherwise. The invention, therefore, consists essentially in a pair of twin propeller or driving shafts arranged in conjunction with suitable power appliances and a joint controlling device, all in combination with right-angled axle shafts to which the main shafts are geared, said right-angled shafts carrying drive wheels or elements, and the whole being controlled in such a way that the main shafts may be driven at the same or different speeds; and the invention further comprises numerous details and peculiarities in the construction, arrangement, and combination of the various parts, substantially as will be hereinafter described and claimed.

In the accompanying drawing illustrating my invention:

Figure 1 is a diagrammatic plan view of a pair of internal combustion or other engines, a pair of parallel longitudinal automobile main drive shafts actuated independently by said engines, connections between the main shafts and the axle shafts, a joint throttling device for the two engines whereby the same operate at like or different speeds, and other parts for making up the entire variable speed driving combination.

Fig. 2 is a similar diagrammatic plan view of the same parts with some slight modifications, particularly in the omission of a gear case for the main driving shafts and a corresponding change in the gear connections between the axle shafts and the main shafts to provide for a reverse motion of the shafts.

Fig. 3 is a detail plan view of the steering wheel and coöperating parts.

Fig. 4 is a cross-section on the line 4, 4 of Fig. 3.

Similar characters of reference designate corresponding parts throughout the different figures of the drawing.

Referring first to Fig. 1, it will be noted that 1, 1 denote two parallel longitudinal drive shafts of an automobile or similar vehicle, the same being provided at suitable points with universal joints 2, 3, and 4 to allow the parts of the shaft to occupy the proper position and direction in relation to each other and to the chassis of the machine. Also in the length of each shaft is interposed a gear case 5 having any of the usual well known types of change gearing placed therein whereby the direction of motion of the shafts is reversed and the speed thereof is changed.

6, 6 denotes two engines or motors, preferably internal combustion engines, though they may be other kinds of engines, whose crank shafts are connected to the main shafts in any well-known manner for the purpose of imparting motion thereto, said engine shafts being provided with fly wheels 7, there being also any convenient type of clutch mechanism operated by pedals 8, 8 in any desired manner. The rear ends of the main shafts 1 enter the rear axle casing 9 wherein they are provided with pinions 10 that engage the bevel gear wheels 11 on the axle shafts 12 which carry the drive wheels at the rear of the automobile. It will be noted that the ordinary direction of rotation of shafts 1 when the car is moving forward will be that shown by the arrows on the shafts 1, the direction of the right hand shaft 1 viewing the engine 6 from the right hand of Sheet 1 of the drawing, being clockwise, while the direction of motion of the other one is the reverse, or contraclockwise. By changing the transmission gearing, however, in the usual way whenever required the motion of the shafts 1 may be reversed, so that the automobile can be backed in the opposite direction. Also, in Fig. 1 I have shown a left brake pedal 13 and a right brake pedal 14. The left pedal actuates a link 15 connected to a crank 16 on a transverse shaft 17 having a crank 18 attached to a link 19 fastened to a crank 20 on a brake shaft 21, which operates brake appliances with the left rear drive wheel. The right hand pedal 14 operates a link 22 attached to a crank 23 on a transverse shaft 24 carrying a crank arm 25 pivoted to a link 26 which pulls upon a crank arm 27 mounted on a shaft 28 that operates braking appliances arranged in connection with the right hand rear drive wheel. Thus it will be seen that the two brake devices at the rear axle are arranged, one for the left wheel and the other for the right wheel, and are operated by separate pedals so that the wheels may be checked simultaneously or separately with the same or different degrees of pressure, thus making it possible to cause a turn in the direction of the machine by simply delaying the rotation of one of the wheels while the other is allowed to continue forward at the same speed as before. A hand lever 29 is connected to a crank arm 30 fastened to a shaft 31 on which is another crank arm 32, the same being arranged in connection with the gear casings 5 and the change gearing so that by operating the lever 29, the direction of motion and the speed may be changed. Also 33 denotes an emergency lever attached to a link 34 pivoted to a crank arm 35 on a transverse shaft 36, having arms 37 that are attached to links 38 at the opposite sides of the car, said links 38 pivoted to arms 39 on shafts 40, which serve as brake shafts for operating the emergency brake appliances arranged in connection with both the rear wheels contiguous to the service brakes already described.

41 denotes a steering wheel which is mounted at the front of an automobile on a suitable steering column in the usual way. On this steering wheel 41 is a gas throttle lever 42 and a spark lever 43. Attached to a crosshead 47 are wires or cables 44 which run around pulleys 45 carried on the steering wheel, or otherwise, and also around pulleys 48 near the lower end of the steering column after which they lead forward alongside of the engines 6 to the carbureters 46. The crosshead 47 has a block 49 thereon, which slides in a slot 50 in a spoke 51 of the wheel 41, and the crosshead 47 also has a curved slot 52 therein which is engaged by a pin 53 on the gas lever 42. Thus it will be seen that the rotary movement of the wheel 41 will operate the cables 44 and affect the carbureters 46, opening one and closing the other so that while one engine is given more gas the other will be given less, and the speed of the two will, therefore, be changed. It is apparent moreover that when throttle lever 42 is moved back and forth it will by reason of its loose connection with the crosshead as described open simultaneously both the carbureters or close them, as the two cables 44 being connected to crosshead 47, will be moved to the same extent when the crosshead is moved, and thus the supply of gas and air to the gas engines is easily controlled by the single control device on the steering wheel, or said device may be placed at any other convenient point so that the engines can be enabled to run at the same speed when going straight forward or backward or in variable speeds when it is desired to make a turn, as for instance, in going around a corner so that one of the drive wheels may be reduced in speed below that of the other.

In the diagrammatic view given in Fig. 2 the gear casings 5 are omitted, but in other respects the arrangement is substantially the same except that a reverse gearing is arranged in the rear casing 9 in connection with the rear ends of the twin parallel shafts, which in the case in Fig. 1 is incorporated in the mechanism in the gear case.

Referring now to Fig. 2, 1ª, 1ª designate two parallel longitudinal drive shafts of an automobile or other machine, the same having in the length thereof universal joints 2ª and 4ª having the customary functions. At the forward ends of the twin shafts 1ª are the duplicate internal combustion engines 6ª whose crank shafts are provided with any suitable fly wheel and clutch construction 7ª. The rear ends of the shafts 1ª within the casing 9 are provided with bevel pinions 47 and 53 which mesh with bevel gear wheels 49 on the axle shafts 48 to which the rear driving wheels are attached. In connection with the bevel pinions 47 and 53 on each shaft I arrange clutch devices 54 by means on which either of the pinions 47 or of the pinions 53 may be clutched to the shafts 1ª so that the axle shafts 48 may be rotated in one direction or the other. These clutching devices 54 are operated by a central clutching member 50 which connects by a link 51 with a lever 52 near the steering wheel 2. Thus, in this example of the invention, there is no change gearing to be used for the purpose of reversing the direction of rotation of the main shafts 1. I effect the same result by the use of the clutch devices which I have described whereby the direction of motion of the shafts 48 is reversed and the drive wheels are therefore reversed in motion, the shafts 1ª being regularly revolved in the same direction and the reversal of motion taking place in the short axle shafts 48 instead of the main shafts 1ª. Obviously the shafts 1ª may be revolved in opposite directions to each other, or the same direction, and the gear clutches in the rear casing 9 can be arranged accordingly.

The gas engines 6ª are provided with carbureters 46, one for each engine, which are operated by cables 44, which pass around pulleys carried by the steering wheel and otherwise as shown in Figs. 3 and 4, as I have already explained. Steering wheel 41 in the example shown in Fig. 2 not only has a gas lever 42 but also has the spark lever 43, the same as in Fig. 1.

Furthermore, it will be seen that in the example in Fig. 2 there are clutch pedals 8ª for operating the clutches, the same as in Fig. 1, and there is a brake system consisting of the brake pedals 13 and 14 which connect by suitable leverage with the braking appliances on the rear wheels, the same as in Fig. 1. There is an emergency lever 33 connecting by a link 34 with a crank arm 35 supported on a crank shaft 36, which is arranged in connection with the rear wheels, in the same manner as in Fig. 1, and operating to produce the same results, it being unnecessary here to enumerate again all the specific parts which have previously been described in Fig. 1 in connection with the brake system.

The operation of my improved control mechanism for automobiles and other vehicles and machines will be clearly apprehended from the foregoing description of the construction and arrangement of the various parts without the need of any additional detail information. The parallel main shafts are driven at the same or different speeds by the gas engines at the front of the machine, the speed of which is varied separately as required by the manipulation of the steering wheel and the throttle. In driving straight ahead the engines will run at the same speed and consequently the parallel shafts will be driven at the same speed, which speed can be accelerated or decreased in the ordinary way by the manipulation of the throttle lever 43 which will open and close the supply of mixture through the carbureters in both cases to an equal degree so that the speed of the engines will be kept uniform. When, however, a turn is being made, as in going around a corner or avoiding an obstacle in the road or otherwise, the steering wheel will be manipulated accordingly, and the result will be to decrease the fuel supply for one engine while increasing it for the other engine so that one engine will, therefore, run faster than the other and one shaft faster than the other, and consequently one of the drive wheels will run faster than the other, so that the outside wheel in making a turn will keep its speed and increase it to some extent while the other wheel will decrease its speed, or even come almost to a stop if the turn is sharp enough. From the explanation I have already given of the steering wheel 41, the cables 44, their pulley supports, crosshead connection, etc., as well as the carbureters 46, it will be understood that as the steering wheel is rotated more or less, the cables 44 will pull together on the carbureter valves so that the supply of fuel will vary, and obviously this variation in the fuel supply for the two gas engines will take place just the same no matter what the speed of the engines may be, that is to say, the variation will be in the same ratio whether the engines are running at a lower or higher speed. Furthermore, it will be understood that in the case illustrated in Fig. 1 where a gear case is employed in connection with each one of the main shafts, the speed changes as well as a reversal of motion are accomplished by changing the gearing in the gear case so that the shafts 1 are driven at certain times in directions opposite to what they are at other times, and usually in directions opposite to each other as indicated, whereas in the case illustrated in Fig. 2 where gear casings are not employed, I use inside of the rear housing or casing 9 gear shifting clutches 54 whereby the direction of motion of the axle shafts 48 is reversed for the purpose of changing the direction of travel of the car, the direction of rotation of the shafts 1ª, 1ª, being the same, therefore, at all times and usually being opposite to each other. In practice, therefore, it will be seen that a great many advantages will be attained by the simple method of joint control of two independently actuated shafts whereby they are driven at the same or different speeds, there being many advantages in the combination with this control of the braking appliances which are independently applicable to the different drive wheels or drive shafts.

Many changes in the various details in which the invention is embodied may be made without exceeding the scope of the same as herein outlined, and I, therefore, reserve the liberty of modifying the invention to adapt it to innumerable other cases to enable it to serve for various purposes not herein specifically stated, and broaden out the scope of application of the same as far as may be possible within the limits of the appended claims.

Having thus described my invention, what I claim as new and desire to secure by Letters Patent, is:—

1. In a mechanism of the class described, the combination of a pair of parallel main shafts, separate engine mechanisms for independently actuating said shafts, and means for jointly and separately controlling the operation of said engine mechanisms so that they can run at the same or different speeds, together with brake appliances operated independently for retarding the motion of the different shafts.

2. In a mechanism of the class described, the combination of a pair of parallel main shafts, vehicle axle shafts at right angles thereto and driven by said main shafts, separate engine devices for independently actuating said main shafts, and means for jointly and separately controlling the operation of said engine devices so that the main shafts may run at the same or different speeds, together with independently operated brake appliances for the shafts.

3. In a mechanism of the class described, the combination of a pair of parallel main shafts, engines for separately actuating them, separate brake appliances for the shafts, and a control device for jointly controlling the operation of said engines in order that they may run at the same or different speeds, said control device having a single operating lever.

4. In a mechanism of the class described, the combination of a pair of parallel main shafts, separate internal combustion engines for independently actuating said shafts, and means for jointly and separately controlling the fuel supply of said engines so that they can run at the same or different speeds, brake appliances operated independently for retarding the motion of the different shafts.

5. In a mechanism of the class described, the combination of a pair of parallel main shafts, vehicle axle shafts at right angles thereto and driven by said main shafts, internal combustion engines for independently actuating said main shafts, and a control device for jointly controlling the fuel supply for said engines so that the main shafts may be actuated at the same or different speeds, together with brake appliances operated independently for retarding the motion of the different shafts.

6. In a mechanism of the class described, the combination of a pair of parallel main shafts, internal combustion engines for separately actuating said shafts, right angle axle shafts arranged to be driven by said main shafts at the same or different speeds, a control device for jointly and separately controlling the operation of the engines so that the said axle shafts may run at the same or different speeds but always with a positive rotary motion, and separate brake appliances for the shafts.

7. In a mechanism of the class described, the combination of a pair of parallel main shafts, internal combustion engines for independently actuating said shafts, said engines having carbureting mechanisms, means for jointly and separately controlling the operation of the carbureting mechanisms, a steering wheel, and devices thereon connecting with the means for operating the carbureters, and separate brake appliances for the shafts.

8. In a mechanism of the class described, the combination of parallel main shafts, gas engines for independently driving these shafts, a steering wheel, a throttle lever on said wheel, and connections between said throttle lever, steering wheel and engines whereby the rotation of the steering wheel controls the supply of fuel to the engines, so that they can run at varying speeds, and the throttle lever controls the quantity of fuel supply.

9. In a mechanism of the class described, the combination of a pair of parallel main shafts, internal combustion engines for independently actuating said shafts, a controlling device for jointly and separately controlling the operation of said engines so that they can run at the same or different speeds, a brake appliance for retarding the motion of one shaft, another brake appliance for retarding the motion of the other shaft, said brake appliances being operable independently.

10. In a mechanism of the class described, the combination of a pair of parallel main shafts, internal combustion engines for independently actuating said shafts, means for controlling the operation of said engines so that they can run at the same or different speeds, brake appliances operated independently for retarding the motion of the different shafts, and emergency brake appliances.

In testimony whereof I affix my signature.

WILLIAM J. P. MOORE.